(12) United States Patent
Varela et al.

(10) Patent No.: US 9,291,223 B2
(45) Date of Patent: Mar. 22, 2016

(54) AXLE ASSEMBLY HAVING A STEERING KNUCKLE

(71) Applicant: ArvinMeritor Technology, LLC, Troy, MI (US)

(72) Inventors: Tomaz Dopico Varela, Shelby Township, MI (US); Degao Li, Windsor (CA)

(73) Assignee: ArvinMeritor Technology, LLC, Troy, MI (US)

( * ) Notice: Subject to any disclaimer, the term of this patent is extended or adjusted under 35 U.S.C. 154(b) by 243 days.

(21) Appl. No.: 13/898,734

(22) Filed: May 21, 2013

(65) Prior Publication Data

US 2014/0345994 A1 Nov. 27, 2014

(51) Int. Cl.
| | | |
|---|---|---|
| *F16D 65/00* | (2006.01) | |
| *F16D 51/20* | (2006.01) | |
| *F16D 65/18* | (2006.01) | |
| *B62D 7/18* | (2006.01) | |

(52) U.S. Cl.
CPC ............ *F16D 65/0062* (2013.01); *F16D 51/20* (2013.01); *F16D 65/18* (2013.01); *B62D 7/18* (2013.01)

(58) Field of Classification Search
CPC . F16D 65/0062; F16D 2125/30; F16D 51/22; B62D 7/18; B62D 2206/50
USPC .............................. 280/264, 88, 93.512, 96.1
See application file for complete search history.

(56) References Cited

U.S. PATENT DOCUMENTS

| | | | | |
|---|---|---|---|---|
| 3,076,531 | A * | 2/1963 | Fisher et al. | 188/205 R |
| 3,366,200 | A * | 1/1968 | Hayes | 188/73.43 |
| 3,368,648 | A * | 2/1968 | Brownyer | 188/330 |
| 5,219,176 | A * | 6/1993 | Mitchell | 280/93.512 |
| 5,624,011 | A * | 4/1997 | White et al. | 188/329 |
| 6,116,626 | A * | 9/2000 | Cherry et al. | 280/124.135 |
| 6,612,390 | B2 * | 9/2003 | Bennett et al. | 180/254 |
| 7,055,662 | B1 * | 6/2006 | Jones et al. | 188/341 |
| 7,175,009 | B2 * | 2/2007 | Clark et al. | 188/329 |
| 8,322,737 | B2 * | 12/2012 | Dodd et al. | 280/124.128 |
| 8,616,565 | B1 * | 12/2013 | Delorenzis | 280/89.11 |
| 2006/0021834 | A1 * | 2/2006 | Kwasniewski | 188/329 |
| 2008/0067020 | A1 * | 3/2008 | Barbosa et al. | 188/325 |

FOREIGN PATENT DOCUMENTS

CN 202378943 U 8/2012

OTHER PUBLICATIONS

Chinese Patent Office, First Office Action for the corresponding Chinese Patent Application No. 201410074424.2 mailed Nov. 12, 2015.

* cited by examiner

*Primary Examiner* — Thomas Irvin
(74) *Attorney, Agent, or Firm* — Brooks Kushman P.C.

(57) ABSTRACT

An axle assembly having a steering knuckle and a brake spider. The steering knuckle may include a spindle and a camshaft tube hole that may receive a camshaft for actuating a brake pad assembly. The brake spider may be disposed on the steering knuckle and may not encircle the spindle.

20 Claims, 5 Drawing Sheets

AXLE ASSEMBLY HAVING A STEERING KNUCKLE

TECHNICAL FIELD

This patent application relates to an axle assembly having a steering knuckle.

BACKGROUND

A steer axle brake assembly is disclosed in U.S. Pat. No. 5,624,011.

SUMMARY

In at least one embodiment an axle assembly is provided. The axle assembly may include a steering knuckle and a brake spider. The steering knuckle may have a spindle that supports a wheel hub assembly and a camshaft tube hole. The brake spider may be disposed on the steering knuckle and may be configured to support a brake pad assembly. The brake spider may not encircle the spindle.

In at least one embodiment an axle assembly is provided. The axle assembly may include a steering knuckle, a camshaft, and a brake spider. The steering knuckle may have a spindle and a camshaft tube hole. The spindle may be configured to rotatably support a wheel hub assembly. The camshaft tube hole may be spaced apart from the spindle. The camshaft may be rotatably disposed in the camshaft tube hole for actuating the brake pad assembly. The brake spider may be fixedly disposed on the steering knuckle such that the brake spider is not disposed between the spindle and the camshaft tube hole.

In at least one embodiment an axle assembly is provided. The axle assembly may include a steering knuckle, a spindle, a camshaft tube hole, and a camshaft. The steering knuckle may have a spindle and a camshaft tube hole. The spindle may be configured to rotatably support a wheel hub assembly. The camshaft tube hole may extend through the steering knuckle. The camshaft tube may be disposed in the camshaft tube hole. The camshaft may be rotatably disposed in the camshaft tube for actuating a brake pad assembly. The brake spider may be fixedly disposed on the steering knuckle and may be configured to support the brake pad assembly. The brake spider may be spaced apart from the spindle, the camshaft tube, and the camshaft.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
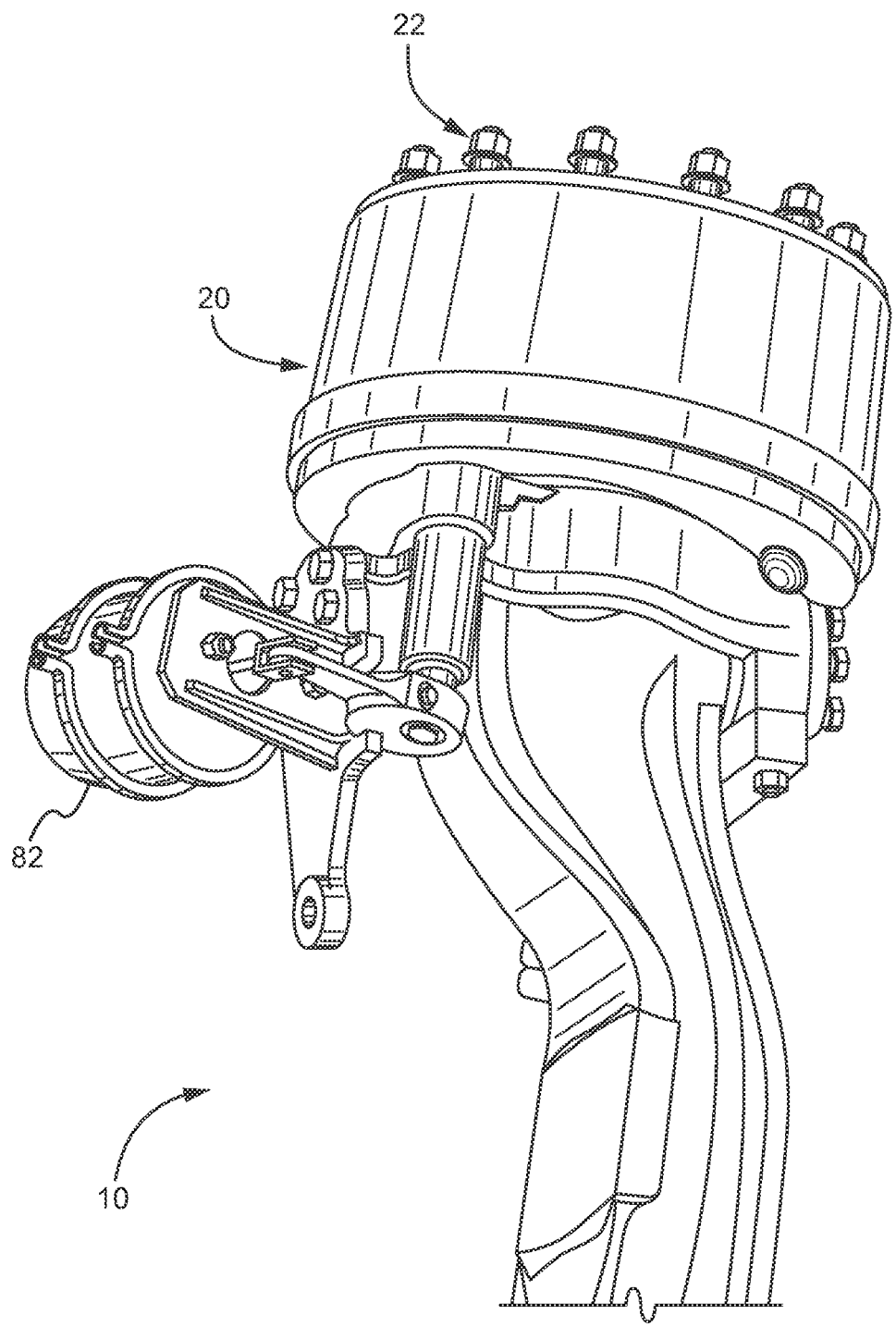
FIG. 1 is a perspective view of an axle assembly.
Figure 2:
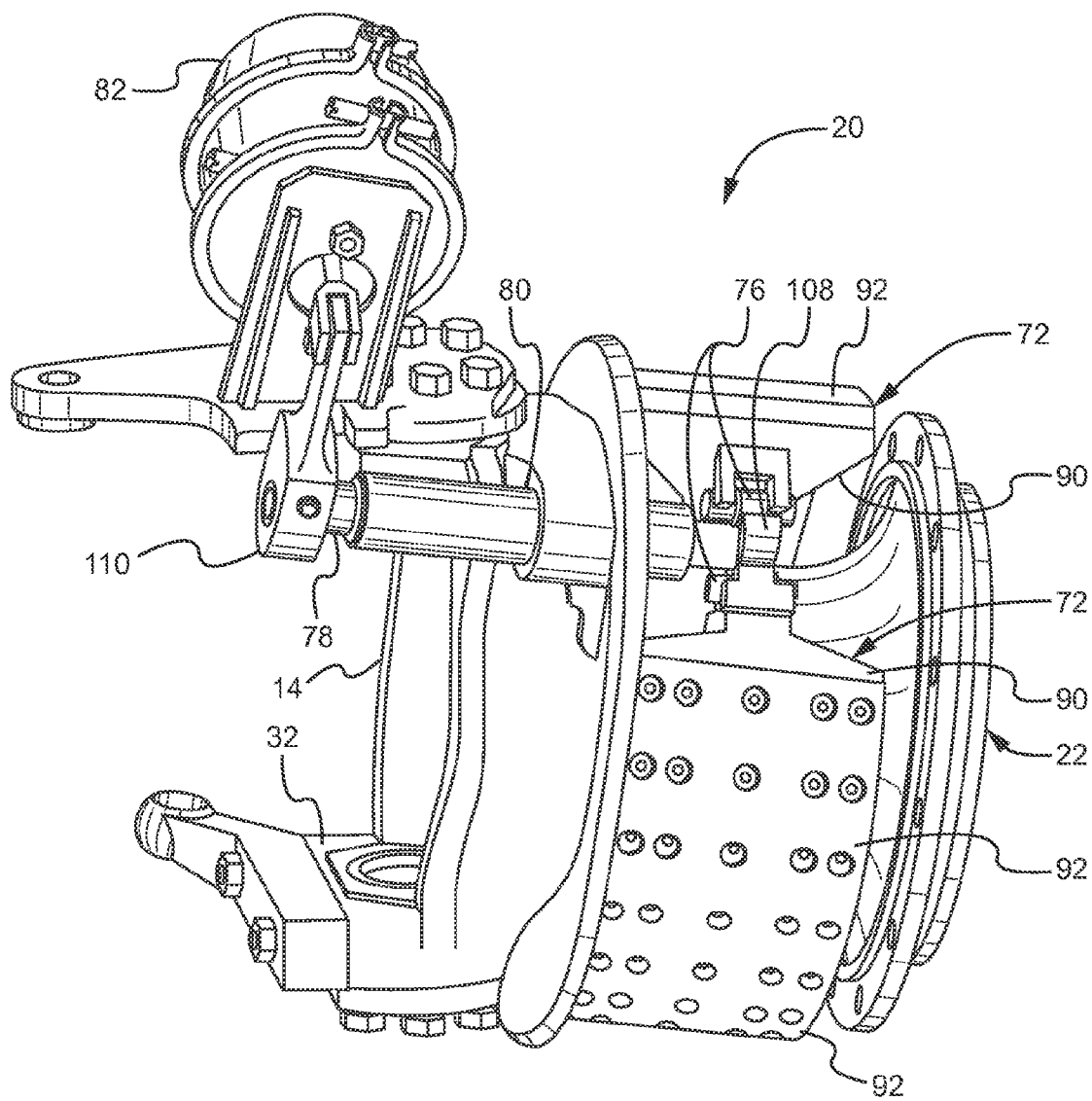
FIG. 2 is a perspective view of a portion of the axle assembly without an axle beam and brake drum.
Figure 3:
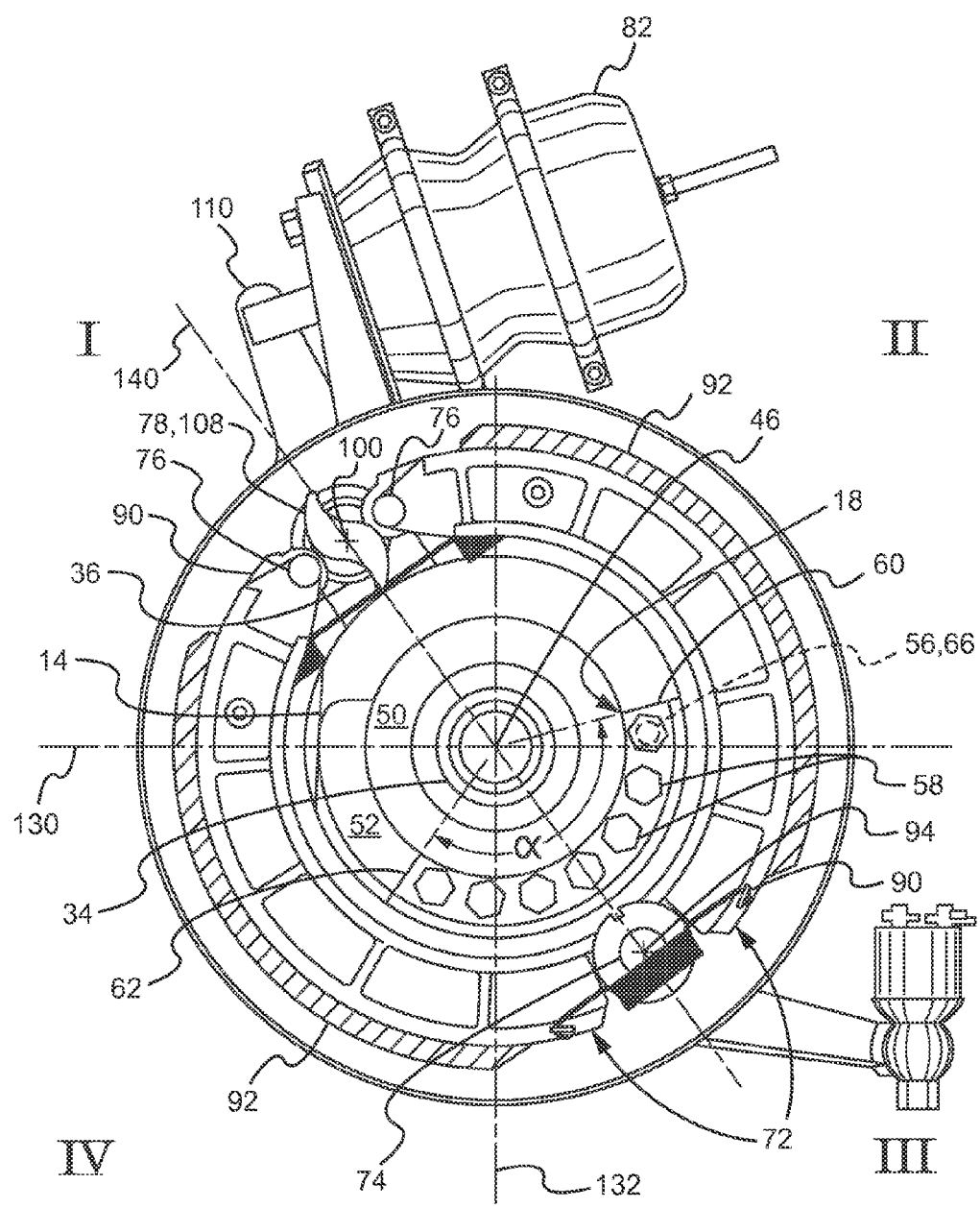
FIG. 3 is an end view of a portion of the axle assembly with a wheel hub assembly removed.
Figure 4:
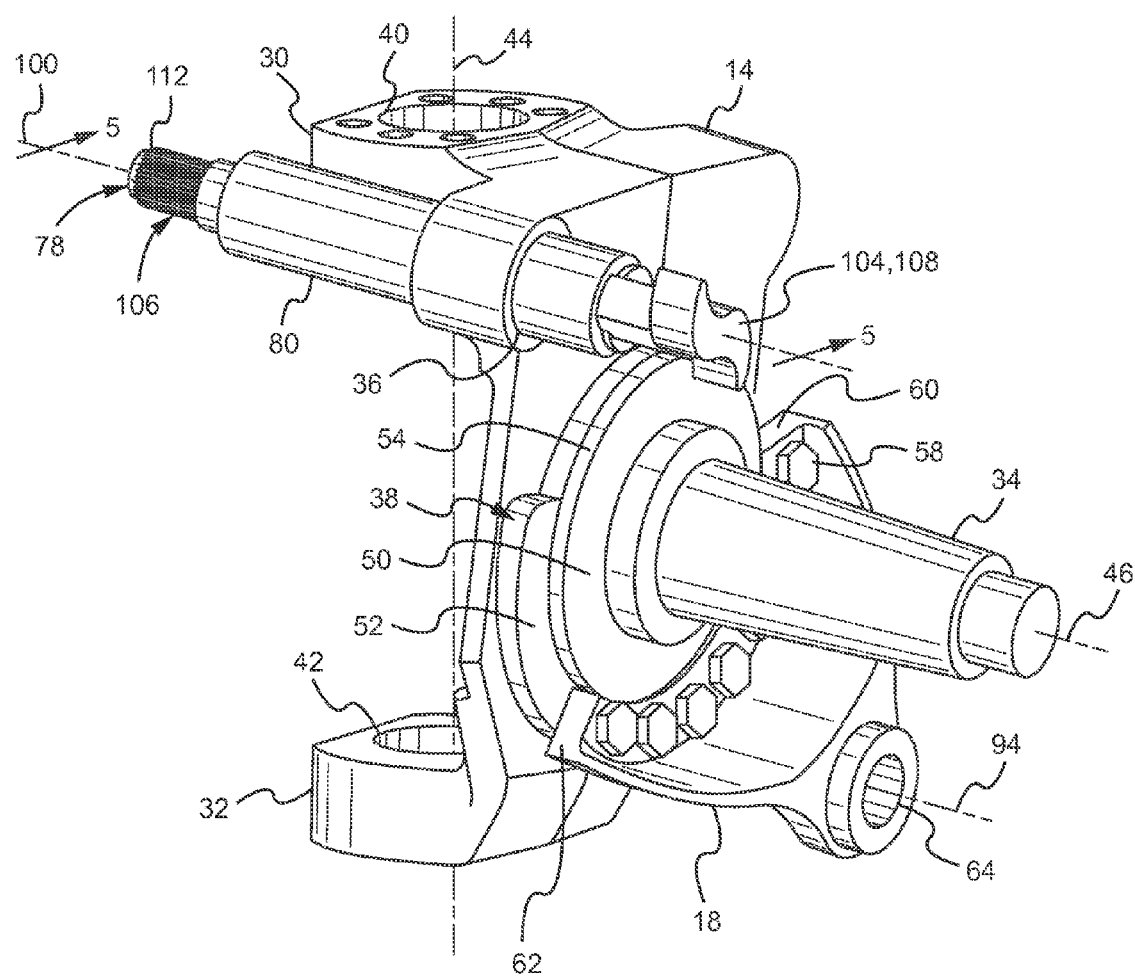
FIG. 4 is a perspective view of a portion of the axle assembly including a steering knuckle, a brake spider, a camshaft tube and a camshaft.

Referring to FIG. 1, an exemplary axle assembly 10 is shown. The axle assembly 10 may be provided with a motor vehicle, such as a truck, bus, farm equipment, military transport or weaponry vehicle, or cargo loading equipment for land, air, or marine vessels. The axle assembly 10 is shown in FIGS. 2-4 with various components removed to better illustrate various features. The axle assembly 10 may include an axle beam 12, a steering knuckle 14, a kingpin 16, a brake spider 18, a brake assembly 20, and a wheel hub assembly 22.

The axle beam 12 may be configured to be mounted to the vehicle and may be part of a vehicle suspension system. The axle beam 12 may be made of any suitable material, such as a metal or metal alloy. In addition, the axle beam 12 may be a forging and may have a unitary one-piece construction. The axle beam 12 may include a kingpin hole that may receive the kingpin 16, which is hidden in FIG. 1.

The steering knuckle 14 may be pivotally disposed on the axle beam 12 and may be part of a steering system that may steer or change the direction of travel of the vehicle. As is best shown in FIG. 4, the steering knuckle 14 may include a first arm 30, a second arm 32, a spindle 34, a camshaft tube hole 36, and a brake spider mounting portion 38.

The first and second arms 30, 32 may be spaced apart from each other and may include first and second holes 40, 42, respectively. The first and second holes 40, 42 may be coaxially disposed or aligned along a kingpin axis 44. The first and second holes 40, 42 may receive opposing ends of the kingpin 16. In addition, the first and second holes 40, 42 may each receive a bearing that may be disposed between the kingpin 16 and the steering knuckle 14 to facilitate rotation of the steering knuckle 14 about the kingpin axis 44 and with respect to the axle beam 12 and kingpin 16. As such, the kingpin 16 may pivotally couple the steering knuckle 14 to the axle beam 12.

The spindle 34 may support the wheel hub assembly 22, which may facilitate mounting and rotation of a vehicle wheel. More specifically, the spindle 34 may support one or more wheel bearings that may support and facilitate rotation of the wheel hub assembly 22 about a spindle axis 46 along which the spindle 34 may extend. The spindle 34 may be integrally formed or forged with the first and/or second arms 30, 32 such that the steering knuckle 14 has a unitary or one-piece construction and the spindle 34 is not a separate component. Alternatively, the spindle 34 may be provided as a separate component that may be fastened to the steering knuckle 14 in one or more embodiments.

The camshaft tube hole 36 may extend through the steering knuckle 14. The camshaft tube hole 36 may be spaced apart from the first arm 30, the second arm 32, the spindle 34, and the brake spider mounting portion 38. The camshaft tube hole 36 may extend along an axis that may be disposed substantially parallel to the spindle axis 46 in one or more embodiments.

The brake spider mounting portion 38 may facilitate mounting of the brake spider 18 to the steering knuckle 14. The brake spider mounting portion 38 may be spaced apart from the spindle 34 and may include a raised surface 50 and a mounting pad 52.

The raised surface 50 may be disposed between the spindle 34 and the brake spider 18. The raised surface 50 may extend continuously around the spindle 34 in one or more embodiments.

The mounting pad 52 may extend at least partially around the raised surface 50 and may be axially offset from the raised surface 50. A step surface 54 may extend from the mounting pad 52 to the raised surface 50 to provide a surface that may help align and position the spindle 34. The step surface 54 may be radially disposed with respect to the spindle axis 46 and may be disposed substantially perpendicular to the raised surface 50 and/or mounting pad 52.

The mounting pad 52 may include a set of mounting holes 56, which are best shown in FIG. 3. Each member of the set of mounting holes 56 may extend into or through the steering knuckle 14 and may receive a fastener 58, such as a bolt, that may couple the brake spider 18 to the steering knuckle 14. The mounting holes 56 may be spaced apart from each other and may be radially disposed with respect to the spindle axis 46 in one or more embodiments. In addition, the mounting holes 56 may be disposed along a sector or limited angular area with respect to the spindle axis 46 such that the camshaft tube hole 36 and mounting holes 56 are disposed on opposite sides of the spindle 34. As such, the mounting holes 56 may not be disposed between the spindle 34 and the camshaft tube hole 36 or a camshaft tube that may be disposed in the camshaft tube hole 36.

The brake spider 18 may be fixedly disposed on the steering knuckle 14 and may support various components of the brake assembly 20. The brake spider 18 may be generally disposed on an opposite side of the spindle 34 from the camshaft tube hole 36 and may not encircle or extend continuously around the spindle 34 and/or spindle axis 46. As such, the brake spider 18 may extend along a limited angle with respect to the spindle axis 46 and thus may not define a hole through which the spindle 34 may extend. As is best shown in FIG. 3, the brake spider 18 may include a first brake spider end surface 60 and a second brake spider end surface 62 that may extend radially with respect to the spindle axis 46 and that may cooperate with the spindle axis 46 help define an angular distance α along which the brake spider 18 extends. For example, the angular distance α may be less than 180° in one or more embodiments. In one or more embodiments, the brake spider 18 may encircle or extend continuously around the spindle 34 and the angular distance α may be 360°. In FIG. 3, the angular distance α is approximately 120°.

Referring to FIGS. 3 and 4, the brake spider 18 may also include at least one anchor pin hole 64 and a set of brake spider mounting holes 66.

An anchor pin hole 64 that may receive an anchor pin that facilitates mounting and operation of a brake pad assembly will be discussed in more detail below. In the embodiment shown, one anchor pin hole 64 is provided although multiple anchor pin holes may be provided with the brake spider 18 in other embodiments. If multiple anchor pin holes 64 are provided, each anchor pin hole 64 may receive a different anchor pin, which in turn may support different brake pad assemblies.

The brake spider mounting holes 66 may facilitate mounting of the brake spider 18 to the steering knuckle 14. Each brake spider mounting hole 66 may be aligned with a mounting hole 56 on the steering knuckle 14 for receiving a corresponding fastener 58.

Referring to FIGS. 1-3, the brake assembly 20 may be a friction brake that may be configured to slow or inhibit rotation of at least one associated wheel assembly. In FIG. 1, the brake assembly 20 is depicted as a drum brake and may include a brake drum 70, at least one brake pad assembly 72, an anchor pin 74, a cam roller 76, a camshaft 78, a camshaft tube 80, and an actuator 82.

The brake drum 70 may be disposed on the wheel hub assembly 22 and may be fixedly positioned with respect to a vehicle wheel. The brake drum 70 may extend continuously around brake pad assemblies 72 that may be configured to engage the brake drum 70 to slow rotation of a wheel assembly or wheel hub assembly 22 about the spindle axis 46. The brake drum 70 is shown in FIG. 1, but is not shown in FIGS. 2 and 3 to better show various components of the brake assembly 20.

A brake pad assembly 72 may be configured to engage an inner surface of a brake drum 70 to slow the rotation of a vehicle wheel that is coupled to the brake drum 70. In FIGS. 2 and 3, two brake pad assemblies 72 are shown that are generally disposed opposite each other. In at least one embodiment, the brake pad assembly 72 may include a brake shoe 90 and a friction material 92.

The brake shoe 90 may be a structural member of a brake pad assembly 72. The brake shoe 90 may be pivotally mounted to the brake spider 18 at a first end via the anchor pin 74. More specifically, the anchor pin 74 may be fixedly positioned with respect to the brake spider 18 and the brake shoe 90 may pivot about an outer surface or circumference of the anchor pin 74 when the brake pad assembly 72 is actuated. An opposite end of the brake shoe 90 may engage a cam roller 76 that may be disposed proximate or may engage the camshaft 78. The anchor pin 74 may extend along an anchor pin axis 94 that may be disposed substantially parallel to the spindle axis 46 in one or more embodiments.

The friction material 92, which may also be called a brake lining, may be disposed on an outer surface of the brake shoe 90 and may face toward the brake drum 70. The friction material 92 may engage the brake drum 70 during vehicle braking and may be spaced apart from the brake drum 70 when the friction braking is not being applied.

Figure 5:
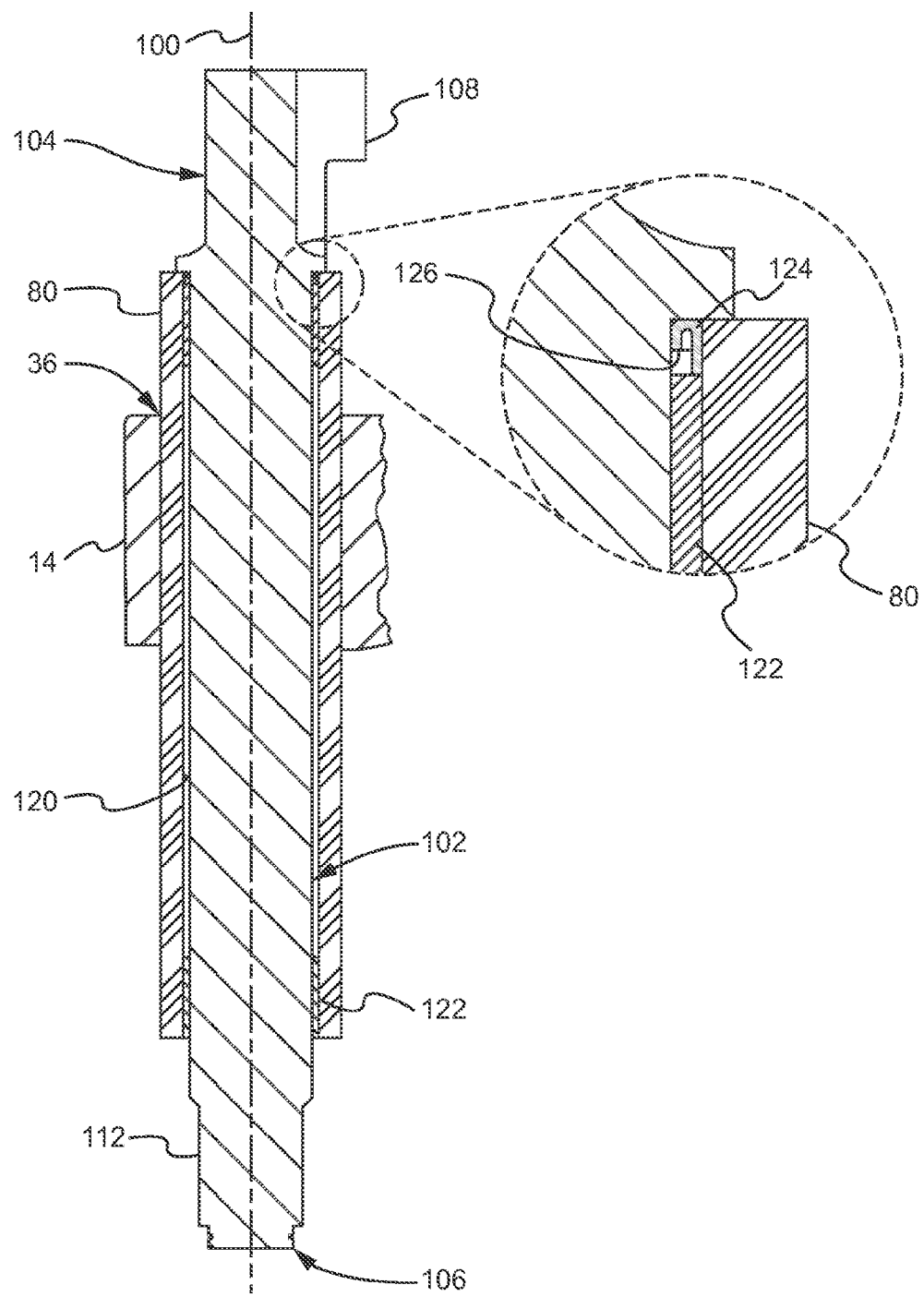
FIG. 5 is a section view along section line 5-5 in FIG. 4.

Referring to FIGS. 2-5, the camshaft 78 may be configured to actuate the brake pad assemblies 72. The camshaft 78 may extend along and may rotate about a camshaft axis 100. The camshaft axis 100 may be disposed substantially parallel to the spindle axis 46 and/or the anchor pin axis 94 in one or more embodiments. In addition, the camshaft 78 may be spaced apart from the brake spider 18. As is best shown in FIGS. 4 and 5, the camshaft 78 may include a body portion 102, a cam portion 104, and an end portion 106.

The body portion 102 may be disposed in the camshaft tube 80. The body portion 102 may extend along the camshaft axis 100 and may be substantially cylindrical.

The cam portion 104 may be disposed at a first end of the body portion 102. The cam portion 104 may include a cam 108, such as an S-cam, that may be configured to engage the cam rollers 76. More specifically, rotation of the camshaft 78 about the camshaft axis 100 in a first direction may cause the cam 108 to actuate the cam rollers 76 and the brake pad assemblies 72 such that the friction material 92 moves toward or engages an inner surface of the brake drum 70 to brake or slow or inhibit rotation of an associated wheel. Rotation of the camshaft 78 about the camshaft axis 100 in a second direction may allow the cam rollers 76 and brake pad assemblies 72 to retract or disengage the inner surface of the brake drum 70.

The end portion 106 may be disposed at a second end of the body portion 102 disposed opposite the cam portion 104. The end portion 106 may be connected to the actuator 82, which may rotate the camshaft 78 about the camshaft axis 100. For instance, the end portion 106 may be coupled to the actuator 82 via a slack adjuster 110 that may be provided to compensate for brake wear or wear of the friction material 92. In at least one embodiment, the end portion 106 may include a spline 112 that may be disposed on an exterior surface of the end portion 106. The spline 112 may mate with a corresponding spline that may be disposed in a hole of the slack adjuster 110 to inhibit rotation of the slack adjuster 110 with respect to the end portion 106.

The actuator 82 may be of any suitable type, such as a pneumatic, hydraulic, electrical, or electromechanical actuator, and may be mounted on the steering knuckle 14 with an actuator mounting bracket.

The camshaft tube 80 may facilitate mounting of the camshaft 78 to the steering knuckle 14 and alignment of the camshaft 78. The camshaft tube 80 may extend through the camshaft tube hole 36 and may be fixedly disposed on the steering knuckle 14 in any suitable manner, such as by press fitting, welding, or with one or more fasteners, such as a pin or bolt.

The camshaft tube 80 may include a hole 120 through which the camshaft 78 may extend. One or more bushings 122 may be disposed in the hole 120 in the camshaft tube 80 for rotatably supporting the camshaft 78. In FIG. 5, two bushings 122 are shown that are spaced apart from each other and are disposed between the camshaft 78 and the inside circumference of the camshaft tube 80.

One or more seals 124 may be provided to help retain a lubricant and/or inhibit the entry of contaminants between the camshaft 78 and the bushing 122. In FIG. 5, a seal 124 is located proximate an end of the camshaft tube 80 between the bushing 122 located near the cam portion 104 and a cam portion 104 of the camshaft 78. Another seal 124 may be provided at the opposite end of the camshaft tube 80 in one or more embodiments. The seal 124 may have a distal end 126 that may extend away from the cam portion 104.

Referring to FIG. 3, the steering knuckle 14 may be divided into four quadrants about the spindle axis 46 by first and second axes 130, 132 or first and second planes that may be disposed substantially perpendicular to each other and may intersect at the spindle axis 46. For instance, the first and second axes may represent horizontal and vertical planes. The four quadrants may be designated with Roman numerals (I, II, III and IV). The camshaft tube hole 36 and camshaft 78 may be disposed in a different quadrant than the brake spider 18. For instance, in FIG. 3, the camshaft tube hole 36 and camshaft 78 are disposed in the first quadrant (I) and the brake spider 18 is disposed in the second (II), third (III), and fourth (IV) quadrants, but not the first quadrant (I). Alternatively, the brake spider 18 may be disposed in a fewer number of quadrants, such as a single quadrant or two quadrants (e.g., II and III, III and IV). In addition, the spindle axis 46, anchor pin axis 94, and camshaft axis 100 may be coplanar or may be disposed in or extend along a common line or plane 140. As such, the anchor pin axis 94 and camshaft axis 100 may be disposed on opposite sides of the spindle 34 or spindle axis 46.

In one or more embodiments, the axle assembly may allow a steering knuckle to be forged yet receive a camshaft tube that facilitated proper alignment of the camshaft to allow proper brake assembly operation. In addition, a smaller, lighter, less expensive brake spider may be provided that utilizes fewer fasteners and has fewer machines surfaces as compared with a brake spider that encircles the spindle. Moreover, the camshaft and camshaft tube may be spaced apart from the brake spider, thereby eliminating an associated hole in the brake spider that may otherwise receive the camshaft and an additional camshaft bushing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a steering knuckle that includes:
      a spindle that supports a wheel hub assembly; and
      a camshaft tube hole; and
   a brake spider that is a separate component from the steering knuckle that is directly attached to the steering knuckle, the brake spider having an anchor pin hole that receives an anchor pin that is configured to support a brake pad assembly and does not engage the steering knuckle, wherein the brake spider does not encircle the spindle.

2. The axle assembly of claim 1 further comprising:
   a camshaft tube disposed in the camshaft tube hole and spaced apart from the brake spider; and
   a camshaft rotatably disposed in the camshaft tube for actuating the brake pad assembly.

3. The axle assembly of claim 2 wherein the camshaft is spaced apart from the brake spider.

4. The axle assembly of claim 2 wherein the camshaft tube extends through the camshaft tube hole and is fixedly positioned with respect to the steering knuckle.

5. The axle assembly of claim 2 wherein the anchor pin hole and the anchor pin are spaced apart from and do not engage the steering knuckle.

6. The axle assembly of claim 5 wherein the spindle is disposed between and is spaced apart from the anchor pin and the camshaft.

7. The axle assembly of claim 1 wherein the steering knuckle has a unitary one-piece construction that includes the spindle.

8. An axle assembly comprising:
   a steering knuckle that includes:
      a spindle configured to rotatably support a wheel hub assembly; and
      a camshaft tube hole that is spaced apart from the spindle;
   a camshaft rotatably disposed in the camshaft tube hole for actuating a brake pad assembly; and
   a brake spider that has an anchor pin hole that receives an anchor pin that supports the brake pad assembly and does not engage the steering knuckle, wherein the brake spider is a separate component from the steering knuckle that is fixedly attached to and engages the steering knuckle such that the brake spider is not disposed between the spindle and the camshaft tube hole.

9. The axle assembly of claim 8 further comprising a camshaft tube that is disposed in the camshaft tube hole and that receives the camshaft, wherein the camshaft tube and brake spider are disposed on opposite sides of the spindle.

10. The axle assembly of claim 8 wherein the steering knuckle includes an inner ring that extends around the spindle and an outer sector that extends partially around the inner ring, wherein the brake spider is disposed on the outer sector and does not encircle the spindle.

11. The axle assembly of claim 10 wherein a set of mounting holes extend through the outer sector, wherein each member of the set of mounting holes receives a fastener for securing the brake spider to the steering knuckle.

12. The axle assembly of claim 11 wherein the set of mounting holes are not disposed between the spindle and the camshaft tube.

13. The axle assembly of claim 8 wherein the anchor pin extends along an anchor pin axis, wherein the spindle extends along a spindle axis, the camshaft extends along a camshaft axis, and wherein the spindle axis, anchor pin axis, and camshaft axis are coplanar.

14. The axle assembly of claim 8 wherein the spindle extends along a spindle axis and the steering knuckle is divided into four quadrants about the spindle axis, wherein the camshaft tube hole is disposed in a first quadrant and the brake spider is not disposed in the first quadrant.

15. An axle assembly comprising:
   a steering knuckle that includes:
      a spindle configured to rotatably support a wheel hub assembly; and
      a camshaft tube hole that extends through the steering knuckle;
   a camshaft tube disposed in the camshaft tube hole;
   a camshaft rotatably disposed in the camshaft tube for actuating a brake pad assembly; and
   a brake spider that is a separate component from the steering knuckle and is fixedly attached to the steering knuckle, the brake spider having an anchor pin hole that receives an anchor pin that supports the brake pad assembly, wherein the brake spider is spaced apart from and does not engage the spindle, camshaft tube, and the camshaft.

16. The axle assembly of claim 15 wherein the camshaft tube extends through the camshaft tube hole.

17. The axle assembly of claim 16 further comprising a first bushing disposed in the camshaft tube that rotatably supports the camshaft.

18. The axle assembly of claim 17 further comprising a second bushing disposed in the camshaft tube that is spaced apart from the first bushing and that rotatably supports the camshaft.

19. The axle assembly of claim 17 further comprising a seal disposed proximate an end of the camshaft tube between the first bushing and a cam portion of the camshaft.

20. The axle assembly of claim 19 wherein the seal has a distal end that extends away from the cam portion.

* * * * *